United States Patent
Hwang et al.

(10) Patent No.: US 6,501,958 B1
(45) Date of Patent: Dec. 31, 2002

(54) METHOD FOR CONTROLLING FORWARD POWER CONTROL UTILIZING AN ERASURE INDICATOR BIT IN A CDMA SYSTEM

(75) Inventors: Yun-seok Hwang, Seoul (KR); Pyeong-hwan Wee, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/360,915

(22) Filed: Jul. 26, 1999

(30) Foreign Application Priority Data

Jul. 29, 1998 (KR) .............................. 98-30483

(51) Int. Cl.$^7$ .............................. H04B 7/00; H04Q 7/20
(52) U.S. Cl. ..................... 455/522; 455/69; 455/453; 370/342; 370/318
(58) Field of Search ..................... 455/522, 69, 453, 455/88, 63, 501, 517; 370/342, 441, 485, 500, 318

(56) References Cited

U.S. PATENT DOCUMENTS

| | | | | |
|---|---|---|---|---|
| 5,390,338 A | * | 2/1995 | Bodin et al. | 455/422 |
| 5,461,639 A | * | 10/1995 | Wheatley et al. | 370/342 |
| 5,574,983 A | * | 11/1996 | Douzono et al. | 455/442 |
| 5,604,766 A | * | 2/1997 | Dohi et al. | 370/335 |
| 5,852,782 A | * | 12/1998 | Komatsu | 455/522 |
| 5,884,187 A | * | 3/1999 | Ziv et al. | 455/442 |
| 5,893,035 A | * | 4/1999 | Chen | 455/442 |
| 5,960,361 A | * | 9/1999 | Chen | 455/522 |
| 6,058,107 A | * | 5/2000 | Love et al. | 370/252 |
| 6,144,841 A | * | 11/2000 | Feeney | 455/522 |
| 6,154,659 A | * | 11/2000 | Jalali et al. | 455/522 |
| 6,173,188 B1 | * | 1/2001 | Kim | 455/239.1 |

* cited by examiner

Primary Examiner—Thanh Cong Le
Assistant Examiner—Andrew T Harry
(74) Attorney, Agent, or Firm—Steve Cha; Cha & Reiter

(57) ABSTRACT

A method for controlling forward power utilizing 13K erasure indicator bit in a CDMA system improves the call quality and subscriber capacity by setting a nominal_gain, a maximum traffic channel gain (max_tx_gain), a minimum traffic channel gain (min_tx_gain), and a reduction rate in an optimal combination, wherein the nominal_gain is initial gain of primary traffic channel, the max_tx_gain is maximum gain of traffic channel, the min_tx_gain is minimum gain of traffic channel, and the reduction rate represents a cycle rate to decrease the digital gain by 1 for the received frames. The nominal_gain satisfies $$\frac{E_b}{N_o} = \frac{E_c}{I_o} + P.G + 10\log\left[\frac{(G_T)^2}{(G_P)^2}\right],$$

where $$\frac{E_b}{N_o}$$

is signal strength of traffic channel, $$\frac{E_c}{I_o}$$

is pilot signal strength, P.G is power gain, $G_P$ is pilot signal gain, and $G_T$ is traffic signal gain, and the nominal_gain is adjusted so that a mobile station can have signal strength of traffic channel as 5 dB or more on condition that the pilot signal strength is −14 dB.

2 Claims, 5 Drawing Sheets

| 'EIB' STATE | 1 | 1 | 0 | 0 | 1 | 1 | 1 | 1 | 1 | 1 | 1 | 1 |
|---|---|---|---|---|---|---|---|---|---|---|---|---|
| INCREASE OF TC-GAIN | 5 | 2 | | | 5 | 2 | 2 | 2 | 5 | 2 | 2 | 2 |

|  | PARAMETER | CURRENT ESTABLISHED | CHANGED |
|---|---|---|---|
| BS | NOMINAL GAIN | 70 | 100 |
|  | MAX_TX_GAIN | 90 | 127 |
|  | MIN_TX_GAIN | 40 | 35 |
|  | DECREASE CYCLE OF TRAFFIC SIGNAL STRENGTH | 60 FRAMES | 20 FRAMES |

FIG. 7

| TEST ENVIRONMENT | | BEFORE CHANGING | | AFTER CHANGING | |
|---|---|---|---|---|---|
| | | Ec/Io (dB) | FER (%) | Ec/Io (dB) | FER (%) |
| (1) | AIS+NG, RSSI:-68dBm | -13 | 4.65 | -13 | 0.92 |
| | AIS, RSSI:-95dBm | -13 | 11.78 | -13 | 0.90 |
| | SAME POINT IN AIR SINGLE CELL COVERAGE (JOONGBU) | -13.2 | 7.0 | -9.3 | 0.60 |
| (2) | IN-BUILDING AREA IN AIR SINGLE CELL (Ec/Io IS LOWER THAN -13dB) | -13.87 | 4.83 | -14.03 | 0.96 |
| | AIR SINGLE CELL SPECIFIC PATH (JOONGBU) | -9.39 | 2.45 | -8.33 | 0.71 |
| (3) | MULTI-CELL SPECIFIC PATH (Ec/Io IS LOWER THAN -12dB, ANSAN) | -8.65 | 2.53 | -8.95 | 1.06 |

METHOD FOR CONTROLLING FORWARD POWER CONTROL UTILIZING AN ERASURE INDICATOR BIT IN A CDMA SYSTEM

CLAIM OF PRIORITY

This application makes reference to, incorporates the same herein, and claims all benefits accruing under 35 U.S.C. §119 arising from an application entitled, METHOD FOR CONTROLLING FORWARD POWER UTILIZING AN ERASURE INDICATOR BIT INA CDMA SYSTEM, earlier filed in the Korean Industrial Property Office on Jul. 29, 1998, and there duly assigned Serial No. 1998-30483.

FIELD OF THE INVENTION

The present invention relates to a method used in a mobile communication system for controlling base station forward transmission power utilizing erasure indicator bit (EIB) message, and in particularly to a forward power control method for improving call quality and subscriber capacity of the system using EIB message to adjust the gain of the base station forward transmission power and the rate of the reducing the digital gain of its forward transmission power based on a newly predetermined power control parameter messages stored in the base station.

DESCRIPTION OF THE RELATED ART

As it is well known, a near-far problem arises in the channel quality between a base station and a faraway mobile station. In view of this, a forward power control has been studied to overcome the near-far problem. The forward power control is performed when a frame error at a base station exceeds a predetermined threshold level, in which case the transmission power of the base station to the mobile station is adjusted. The power control on the forward link increases or decreases the transmit power level of base station so that all channels can maintain good call quality when fading or interference occurs, especially in the boundary of a cell where the noise interference is high.

The power control is used to adjust the transmit power of the base station for each traffic channel. When the mobile station is affected by the signals traveling through propagation paths or other multi-path characteristic interference, the transmission power control is performed such that the received power levels of signals transmitted from the mobile stations and receive by the base station, or the SIR (Signal-to-interference power ratio) associated with the received power levels are kept constant at the base station.

Without the power control, the distance of the mobile station located in a neighboring area between base stations is so faraway from the corresponding base station that the transmit power from the base station is weakened. Consequently, a call set-up rate is low and even if the call set-up is successful, the voice quality is poor due to the severe interference in the neighboring base stations.

It will be appreciated by those skilled in the relevant art based on the detailed description provided herein that in a typical forward power control known in the art include a mobile station unit for measuring the quality of a communication signal received by the mobile station from a base station and a unit for producing a base station transmission power control data/forward power control signal, and the base station include a unit for measuring a receiving the forward power control signal, a unit for calculating a power level command based on the received forward power control signal based on control parameters stored in the base station, and a unit for producing a mobile station transmission power control data specifying a mobile station transmission power in accordance with the received.

In power control technique, the mobile station measures the frame error rate (FER) of the forward link by 20 milliseconds (ms) and transmits a forward power control signal to the base station. The base station compares the forward power control signal to a predetermined FER threshold value, and based on such comparison changes the transmission power level by increasing/decreasing the power level allocated to the traffic channel at an increment/decrement rate.

They are different types of forward control signal that is used depending on the system employed. There are power measurement report message (PMRM) used as a forward power control signal in the digital cellular system and erasure indicate bit (EIB) used in the personal communication system (PCS). The PCS makes it possible to report the status of the forward link every frame by adding a bit of EIB to the front of the reverse traffic channel. EIB indicates whether the received frame from the base station to mobile station contains an erasure. For an example, an EIB binary value of "0" can indicate a properly received frame, while a value of "1" can indicates an erased frame or bad frames. That is, in the event that mobile station is unable to successfully decode in response to forward frames, mobile station generates EIB messages having a value of "1" for each erased frame, and transmits these messages back to base station over the reverse link signal.

Base station processes the EIB and determines the gain of its forward link signal based on the EIB messages it receives on the reverse link signal from the mobile station. Base station transmits the forward link signal at a decreasing transmission gain or at an increased gain whenever an EIB message indicating an error is received, and increases or decreases the forward transmission power level transmitted by base station in the subsequent forward frame. By producing the power control signal in such away, it is possible to keep track of the change in the traffic channel more quickly than employing the PMRM method used in the PCS system. The base station receives these forward power control signal from the mobile station via reverse link and extracts the transmission power control bit, and determines its transmission power in accordance with the transmission power control bit.

As described in the above, the forward power control employing the EIB, the base station forward transmission power is depended on power control parameters messages stored in the base station, that is characteristic of the distance between the base station and the mobile station so that the power of the transmitted radio signals as received by the mobile station is not interfering with other cells. The related power control parameters are as follows: 'Step_til_down' for decreasing the digital gain by one per frame if the current traffic channel gain is greater than or equal to a 'slow_down_level,' and for decreasing the digital gain by one per every two frames if the current traffic channel gain is less than the 'slow_down_level,' 'Down_delta' for decreasing the digital gain, 'Nominal_gain' refers to an initial gain of the primary traffic channel when a call is established between the mobile station and the base station, 'Max_tx_gain' refers to a maximum gain of traffic channel, 'min_tx_gain' refers to a minimum gain of traffic channel, 'Big_up_delta' for increasing the digital gain, 'small_up_delta' for increasing the digital gain that is smaller than the digital gain for the 'Big_up_delta,' and, 'Slow_down_level' refers to a value at the level that is bottom one-third down between levels of the max_tx_gain and min_tx_gain.

In operation of the forward power control using the above power control parameters, FIG. 1 illustrates the digital gain increment of the traffic channel in which the PCS increases the digital gain of the traffic channel in case where the value of EIB is 1. Whenever a frame generating EIB message of '1' is received, it adjusts the gain value to either the 'small_up_delta' and the 'big_up_delta' depending on the sequence of received EIB messages. For an example, when twelve frames having a string of EIB messages of '1' or '0' are received as illustrated in FIG. 1 and FIG. 2, the gain is increased as high as '5' initially when EIB message of the first frame corresponds to '1,' and then the subsequently received EIB message of '1' increases the digital gain to as high as '2' three times. That is, the gain is increased with a specific pattern, '5, 2, 2, 2' in sequence. After that, if subsequent repetitive receptions of the EIB message of "1" is received, the value of the subsequent digital gain is adjusted according to the pattern shown in FIG. 2.

Referring to FIG. 3 that is a view of digital gain decrement of the traffic channel according to a conventional method. Whenever the repetitive receptions of a string of EIB messages of '0' (zero) have been continuously received for each 60 frames, the traffic channel gain is decreased by '1' for each 60 frames in sequence if the traffic channel is greater than or equal to 'slow_down_level.' However, if the traffic channel is less than 'slow_down_level,' the traffic channel gain is decreased by '1' for each 120 frames when a string of the EIB messages of '0' (zero) have been repetitively received.

The forward power control based on a predetermined control parameters of forward transmission power of the base station and a string of the EIB messages has help to improve the call quality. In the conventional method of establishing the parameters of the forward power control, the parameters are set only to address to improve the call quality, and not pertained to the subscriber capacity. Thus, there is need for establish the parameters to improve both the subscriber capacity as well as to the call quality. In order to achieve such improvements, the present invention provides a set of control parameters contrary to technologies known in the prior art, which produces an expected improvement in both the call quality and the subscriber capacity. This is done by setting the control parameter for the base station forward transmission power in an optimal way to adjust the digital gain of the base station forward link signal at a specific gain reduction rate, which results in an improvement in the call quality and a higher subscriber capacity compare to the current scheme of the forward power control known in the CDMA system.

SUMMARY OF THE INVENTION

The present invention is intended to provide a method for controlling forward transmission power utilizing erasure indicator bit (EIB) in accordance with a newly set control parameters to yield better call quality and higher subscriber capacity, by re-adjusting the control parameter in a conventional CDMA system.

A preferable embodiment of forward power control method using 13K erasure indicator bit (EIB) in a CDMA system according to the present invention improves the call quality and subscriber capacity by adjusting power control parameter messages which include a nominal_gain, a max_tx_gin, a min_tx_gain, and a periodic_frame_count, wherein the nominal_gain represents an initial gain of the primary traffic channel, the max_tx_gain represents a maximum gain of the traffic channel, min_tx_gain represents a minimum gain of the traffic channel, and a periodic_frame_count represents the rate of decreasing the digital gain by "1."

According to the preferable embodiment of the present invention, it is preferable that the nominal_gain satisfies the following condition:

$$\frac{E_b}{N_o} = \frac{E_c}{I_o} + P.G + 10\log\left[\frac{(G_T)^2}{(G_P)^2}\right],$$

where $$\frac{E_b}{N_o}$$

is signal strength of traffic channel, $$\frac{E_c}{I_o}$$

is pilot signal strength, P.G is power gain, $G_P$ is pilot signal gain, and $G_T$ is the nominal gain, and the nominal_gain is adjusted so that a mobile station can have signal strength of traffic channel about 5 dB which is required to satisfy the minimum call quality or more, but keeping the pilot signal strength at about −14 dB.

According to the preferable embodiment of the present invention, it is preferable that the variable value of the nominal_gain is set to 100 compare to 70 as used in the prior art.

According to the preferable embodiment of the present invention, it is preferable that the reduction rate is adjusted to decrease the digital gain by "1" whenever the number of properly received frames are received for 20 counts if the level of a traffic channel gain (tc_gain) is greater than or equal to a slow-down level, wherein the slow-down level indicates a gain level being at the bottom one-third between the max_tx_gain and min_tx_gain, and to decrease the digital gain by "1" whenever the number of properly received frames are received as much as 40 counts if the level of traffic channel gain (tc_gain) is less than the slow-down level.

According to the preferable embodiment of the present invention, it is preferable that the value for maximum gain of the traffic channel is set to 127, wherein the value of 90 was used for the maximum gain in a known art.

According to the preferable embodiment of the present invention, it is preferable that the value for a minimum gain of the traffic channel is set to 35, wherein the value of 40 was used for the minimum gain in a known art.

According to the preferable embodiment of the present invention, it is preferable that the value of a maximum gain of the traffic channel is set to 127 and the minimum gain of the traffic channel is set to 35.

BRIEF DESCRIPTION OF THE DRAWINGS

FIG. 7 illustrates a view of test-result table after the changing of control parameters according to the present invention; and, FIG. 8 shows a decrement view of handoff area according to the present invention.

DESCRIPTION OF THE PREFERRED EMBODIMENTS

Figures 1, 2:
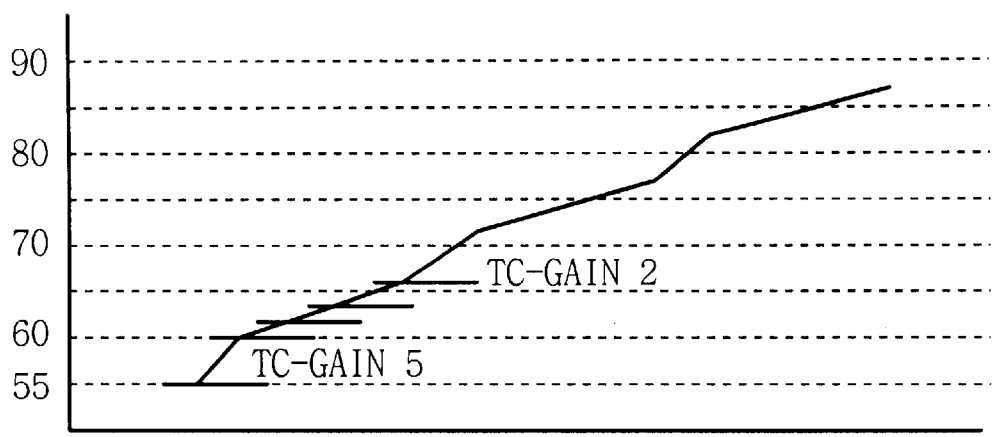
FIG. 1 illustrates an increment gain of the traffic channel.
FIG. 2 illustrates an increment table of the traffic channel gain in accordance with a string of erasure indicator bits.
Figures 3, 4:
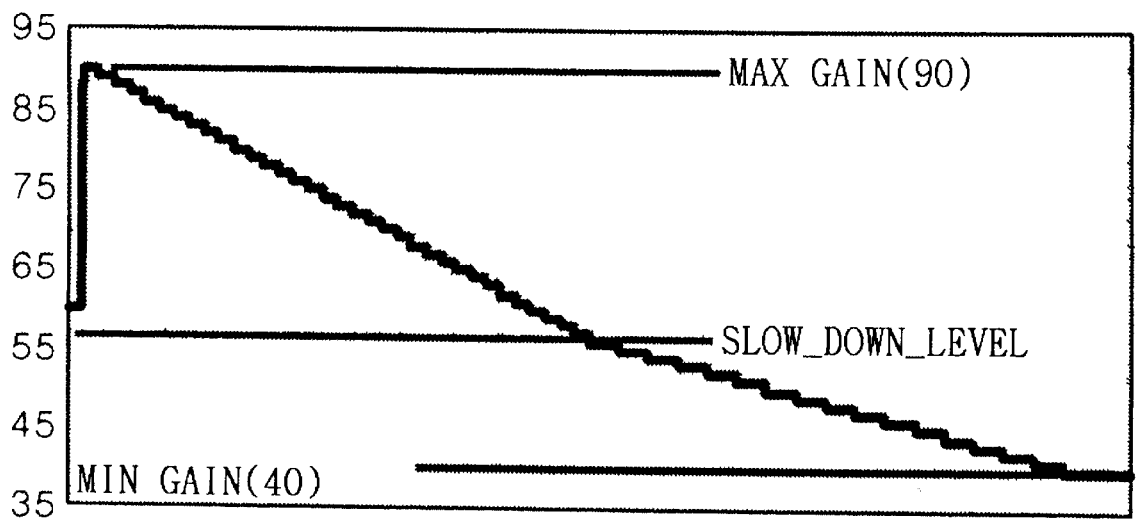
FIG. 3 illustrates a graph showing a decrement gain of the traffic channel according to the conventional method.
FIG. 4 illustrates a comparison table showing control parameters in the known art and parameters according to the present invention.

FIG. 4 illustrates a comparison control parameter table of a base station forward transmission power control according to the present invention and commonly used in the existing systems. The present invention can improve the call quality of CDMA system and increasing the subscriber capacity by setting the range of traffic channel gain in an optimal way and shortening the rate of traffic channel gain. That is, it is possible improve the call quality and to increase the subscriber capacity by setting a nominal gain, a maximum traffic channel gain, and a minimum traffic channel gain in an optimal ways to yield lower signal to noise ratio. The nominal gain refers to an initial gain of the traffic channel when a call is established between a mobile unit and a base station.

By adjusting the value of maximum traffic channel gain from 90 to 127, it is possible to maintain the call quality that has been improved and more effectively controlled the gain compared to the prior art. Since high traffic channel gain may cause a lower subscriber capacity, it is necessary to quickly reduce such traffic channel gain. One control parameter known as a 'step_til_down' is provided to quickly reduce the traffic channel gain and the base station forward transmission power.

Another power control parameter, periodic frame count, which represents a reducing rate of the number of frames over which mobile station is to count frame errors for reducing the traffic channel gain. In the conventional setup, a value of 60 frames is assigned which means that if the frames having a string of EIB messages of '0' (zero) have been received in a base station within the 60 frames, the base station decreases the gain of the present traffic channel in accordance with a 'down_delta' parameter.

The 'down_delta' is preset to '1' in the known art so that the base station decreases the traffic channel gain by '1' if the base station has received the 60 frames having a string of EIB messages of '0' (zero) via a reverse link. Further, if the conventional art, if the traffic channel gain is lower than the 'slow_down_level' of the power control parameters, it is set to operated at 120 frames. That is, when the traffic channel gain of the corresponding traffic channel is lower than the 'slow_down_level', the base station decreases the traffic channel gain by '1' for every 120 frames having a sting of EIB messages of '0' (zero).

In accordance with the present invention, if the periodic frame count is reduced to 20 frames to shorten the reduction rate for the gain of the traffic channel from the 60 frames as used in the prior art, it is possible to more effectively manage the traffic channel gain and thereby increase the subscriber capacity. Accordingly, the present invention proceeds to decrease the gain of traffic channel by '1' when the base station receives a string EIB messages of '0' (zero) for corresponding 20 frames via the reverse link when the frame value is changed from 60 to 20.

Figure 5:
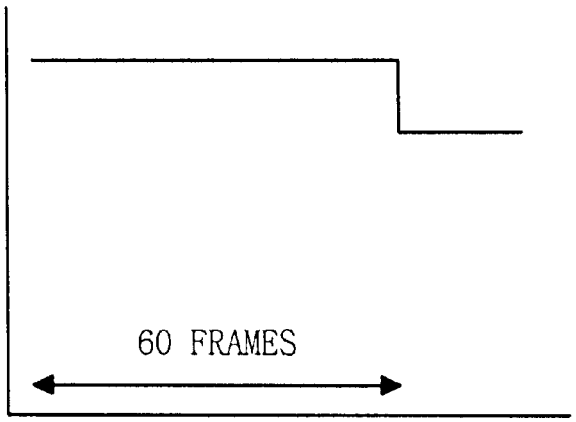
FIG. 5 shows a view of reduction rate of the traffic channel gain according to a conventional method.
Figure 6:
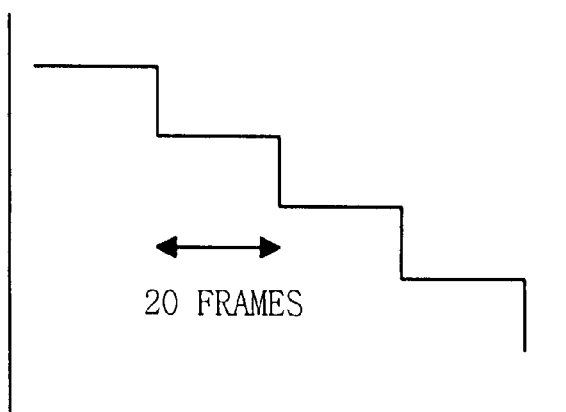
FIG. 6 shows a view of reduction rate of the traffic channel gain according to the present invention.

The change of the traffic channel gain by the above method is illustrated in FIG. 5 and FIG. 6, wherein FIG. 5 illustrates a reduction rate of the traffic channel gain according to a conventional method and FIG. 6 illustrates a reduction rate of the traffic channel gain according to the present invention.

The forward CDMA channel power is shared by the pilot channel, the synchronization channel, the paging channels, and the forward traffic channels. After a call is established between a base station and a mobile station, an initial forward transmission power is transmitted through the traffic channel at a forward power control nominal_gain. In accordance with the present invention, it is necessary adjust the nominal_gain of the prior art power control parameter to yield a signal-to-noise ratio (SIR) on the traffic channel at about 5 dB, and also maintain that the signal-to-noise ratio (SIR) of pilot channel at about −14 dB.

Therefore, the nominal_gain is established to satisfy the following Math Expression 1, where $$\frac{E_b}{N_o}$$

represents a ratio of signal-to-noise ratio indicating a signal strength of traffic channel (5 dB), $$\frac{E_c}{I_o}$$

represents a ratio of signal-to-noise ratio indicating a pilot signal strength,(−14 dB) P.G represents a power gain (19.3 dB), $G_P$ represents a pilot signal gain (108), and $G_T$ represents a nominal gain (100).

[Math Exp. 1]

$$\frac{E_b}{N_o} = \frac{E_c}{I_o} + P.G + 10\log\left[\frac{(G_T)^2}{(G_P)^2}\right] \text{ or}$$

$$\frac{E_b}{N_o} = -14 \text{ dB} + P.G. \ (19.3 \text{ dB}) + 10\log(x^2/108^2)$$

When x is 100 (nominal-gain), the required $$\frac{E_b}{N_o}$$

is satisfied to be approximately 4.6 dB or about 5 dB, which is required to satisfy the minimum call quality in according to the present invention.

As shown in FIG. 7, the test result according to the reassignment of power control parameters in accordance with the present invention satisfying the above equation is shown. The test was done both in the laboratory (1) and in different testing conditions in the real environments. The above condition is satisfied and provides unexpected better results compare to the prior art when the power control parameters are changed as indicated in FIG. 4, and the test results showing the unexpected results is shown in FIG. 7. As such, the FER is greatly improved at the edge of the cell or at a location where the signal-to-noise ratio of pilot signal is usually lower than −12 dB. Normally, an increase in the max_tx_gain lowers the subscriber capacity of the system because a large amount of transmission power change will increase the interference to other cells as provided in the present invention, however, the problem is remedied by setting the power control parameter reduce the base station forward transmission power at every 20 frames, instead of every 60 frames as in the prior art. By shortening the time cycle to reduce the digital gain of the base station more quickly, it is possible to compensate for the interference caused by the large amount of transmission power change.

FIG. 7 illustrates the result of test at the base station of a vacant lot of Miwa in the city of Joongbu in Korea and in the middle of the city of Ansan in accordance with the power control parameters set by the present invention. The test was done for determining the signal-to-noise ratio of pilot signal, $$\frac{E_c}{I_o},$$

using the prior art and the present invention, and the signal-to-noise ratio of pilot signal, $$\frac{E_c}{I_o},$$

was improved from −13.2 dB to −9.3 dB. The effect of fading is small due to the geographical characteristic of the vacant lot. Three different tests were on three different locations having different multi-path characteristics and the overall traffic channel gain on average.

Figure 8:
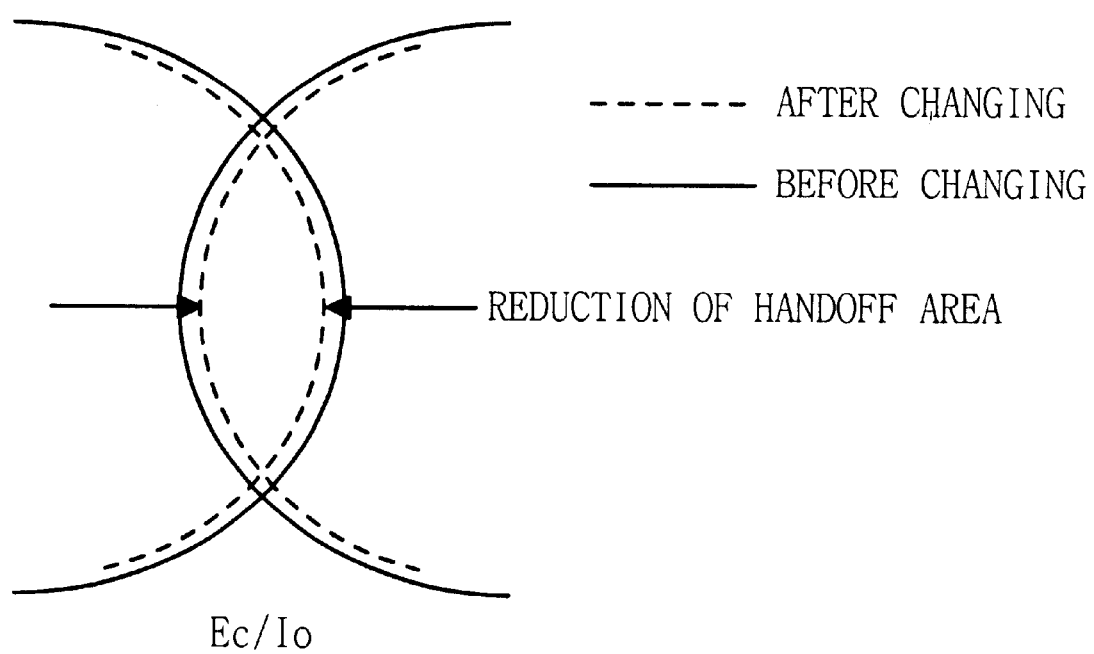

As shown in FIG. 7, by setting the power control parameters in accordance with the present invention, the overall value of $$\frac{E_c}{I_o}$$

is significantly lowered on average by about 0.5 dB for both the In-building (2) and the multi-cell (3) testing environments in comparison to the prior art. Also, as a result of the present invention, the signal-to-noise ratio of pilot signal, $$\frac{E_c}{I_o},$$

on average are less than −12 dB. Moreover, the FER is also significantly improved from the existing 2.5% in prior art to below 1% in accordance with the present invention. These unexpected results are very indispensable in a mobile communication system because a reduction in FER translates to an improvement in the call quality, especially during the handoff process because lower overall average value of $$\frac{E_c}{I_o},$$

translates to a reduction in the handoff area. FIG. 8 shows a reduction in the handoff area of cells in a given system according to the present invention, which translates to an increase in the subscriber capacity in view of the overall system. That is, the capacity of the base station is reduced during the soft handoff since the mobile station connects the traffic channels with two or more base stations over the overlapped area. Since the occurrence of handoff reduces the capacity of the base station, any reduction of the handoff area or the overlapped area increases the capacity of the base station and thus increases the subscriber capacity, due to lower signal-to-noise of pilot signal, $$\frac{E_c}{I_o}.$$

As stated above, the present invention makes it possible to reduce the frame error rate and thus improving the call quality and the subscriber capacity by adjusting power control parameters of the transmission power of the base station.

What is claimed is:

1. A method for improving a call quality and a subscriber capacity using an erasure indicator bit (EIB) as a forward power control signal in a CDMA system of the type having a mobile station and at least one base station, wherein the power control parameter messages of said base station are predetermined and the transmission power of said base station is controlled in accordance with said power control parameter messages, said power control parameter messages include a nominal_gain message for indicating an initial gain of the transmission power of said base station when a call is established between said base station and said mobile station, a max_tx_gain message for indicating a maximum gain of the transmission power of said base station, a min_tx_gain message for indicating a minimum gain of the transmission power of said base station, and a periodic_frame_count message for indicating a reducing rate cycle of a number of frames over which said mobile station is to count frame errors, said method comprising the steps of:

setting the value of said nominal_gain message not substantially less than 100;

setting the value of said max_tx_gain message not substantially less than 127;

setting the value of said min_tx_gain message not substantially greater than 35; and, setting the value of said periodic_frame_count message not substantially greater than 20 if the gain of a traffic channel is greater than or equal to a slow-down level, wherein said slow-down level corresponds to a level being at a bottom one-third between said max_tx_gain and said min_tx_gain, wherein setting said nominal_gain of said power control parameter at said value is determined by following equation:

$$\frac{E_b}{N_o} = \frac{E_c}{I_o} + P.G + 10\log\left[\frac{(G_T)^2}{(G_P)^2}\right],$$

wherein $$\frac{E_b}{N_o}$$

represents a value of signal-to-noise ratio indicating a signal strength of a traffic channel, $$\frac{E_c}{I_o}$$

represents a value of signal-to-noise ratio of a pilot signal strength, P.G represents a value of a power gain, $G_P$ represents a value of a pilot signal gain, and $G_T$ represents the nominal gain, wherein said nominal_gain is set so that said mobile station can produce said signal strength at about 5 dB and keeping said pilot signal strength at about −14 dB.

2. A method for improving a call quality and a subscriber capacity using an erasure indicator bit (EIB) as a forward power control signal in a CDMA system of the type having a mobile station and at least one base station, wherein the power control parameter messages of said base station are predetermined and the transmission power of said base station is controlled in accordance with said power control parameter messages, said power control parameter messages include a nominal_gain message for indicating an initial gain of the transmission power of said base station when a call is established between said base station and said mobile station, a max_tx_gain message for indicating a maximum gain of the transmission power of said base station, a min_tx_gain message for indicating a minimum gain of the transmission power of said base station, and a periodic_frame_count message for indicating a reducing rate cycle of a number of frames over which said mobile station is to count frame errors, said method comprising the steps of:

setting the value of said max_tx_gain message not substantially less than 127;

setting the value of said min_tx gain message not substantially greater than 35;

setting the value of said periodic_frame_count message not substantially greater than 20 if the gain of a traffic channel is greater than or equal to a slow-down level, wherein said slow-down level corresponds to a level being at a bottom one-third between said max_tx_gain and said min_tx_gain;

setting the value of said periodic_frame_count message not substantially greater than 40 if the gain of said traffic channel is smaller than said slow-down level;

setting the value of said nominal_gain message not substantially less than 100; wherein setting said nominal_gain of said power control parameter at said value is determined by following equation:

$$\frac{E_b}{N_o} = \frac{E_c}{I_o} + P.G + 10\log\left[\frac{(G_T)^2}{(G_P)^2}\right],$$

wherein $$\frac{E_b}{N_o}$$

represents a value of signal-to-noise ratio indicating a signal strength of a traffic channel, $$\frac{E_c}{I_o}$$

represents a value of signal-to-noise ratio of a pilot signal strength, P.G represents a value of a power gain, $G_P$ represents a value of a pilot signal gain, and $G_T$ represents the nominal gain, wherein said nominal_gain is set so that said mobile station can produce said signal strength at about 5 dB and keeping said pilot signal strength at about −14 dB.

* * * * *